(12) United States Patent
Rother et al.

(10) Patent No.: US 7,799,106 B2
(45) Date of Patent: Sep. 21, 2010

(54) GAS INTAKE ZONE OF A GAS FILTER HOUSING, USED AS A PREFILTER

(75) Inventors: Thilo Rother, Ludwigsburg (DE); Jürgen Stehlig, Neckartailfingen (DE); Matthias Traub, Böblingen (DE)

(73) Assignee: MAHLE International GmbH, Stuttgart (DE)

( * ) Notice: Subject to any disclaimer, the term of this patent is extended or adjusted under 35 U.S.C. 154(b) by 481 days.

(21) Appl. No.: 11/886,103

(22) PCT Filed: Jun. 23, 2006

(86) PCT No.: PCT/DE2006/001068

§ 371 (c)(1),
(2), (4) Date: Sep. 11, 2007

(87) PCT Pub. No.: WO2007/003158

PCT Pub. Date: Jan. 11, 2007

(65) Prior Publication Data

US 2008/0209869 A1 Sep. 4, 2008

(30) Foreign Application Priority Data

Jul. 2, 2005 (DE) .................. 10 2005 031 059

(51) Int. Cl.
*B01D 45/12* (2006.01)
(52) U.S. Cl. .................. 55/345; 55/348; 55/396; 55/457
(58) Field of Classification Search .................. 55/345, 55/348, 396, 457
See application file for complete search history.

(56) References Cited

U.S. PATENT DOCUMENTS 4,008,059 A 2/1977 Monson et al.

(Continued)

FOREIGN PATENT DOCUMENTS

| DE | 29 18 765 A1 | 11/1980 |
| DE | 298 19 335 U1 | 5/1999 |
| DE | 101 42 701 A1 | 4/2003 |
| DE | 102 35 761 A1 | 2/2004 |
| EP | 1 500 423 A | 1/2005 |
| FR | 1 063 400 A | 5/1954 |
| GB | 2 080 1 55 A | 2/1982 |

OTHER PUBLICATIONS

International Search Report.

*Primary Examiner*—Robert A Hopkins
(74) *Attorney, Agent, or Firm*—Collard & Roe, P.C.

(57) ABSTRACT

The invention relates to a gas intake zone of a separable gas filter housing which removably accommodates a filter element. The gas intake zone is used as a prefilter and comprises a plurality of axially adjacent, axially impinged cyclone collectors that are provided with respective spin generators in the inlet zones thereof and gas-discharging immersion tubes at the discharge end within annular ducts which are located between the immersion tubes and the respectively associated outer cyclone walls while being used for pre-separating dirt particles separated in an outer radial direction in the individual cyclones by means of centrifugal forces, the immersion tubes being axially dipped into the interior of the cyclone collectors.

5 Claims, 2 Drawing Sheets

U.S. PATENT DOCUMENTS

Figure 1:
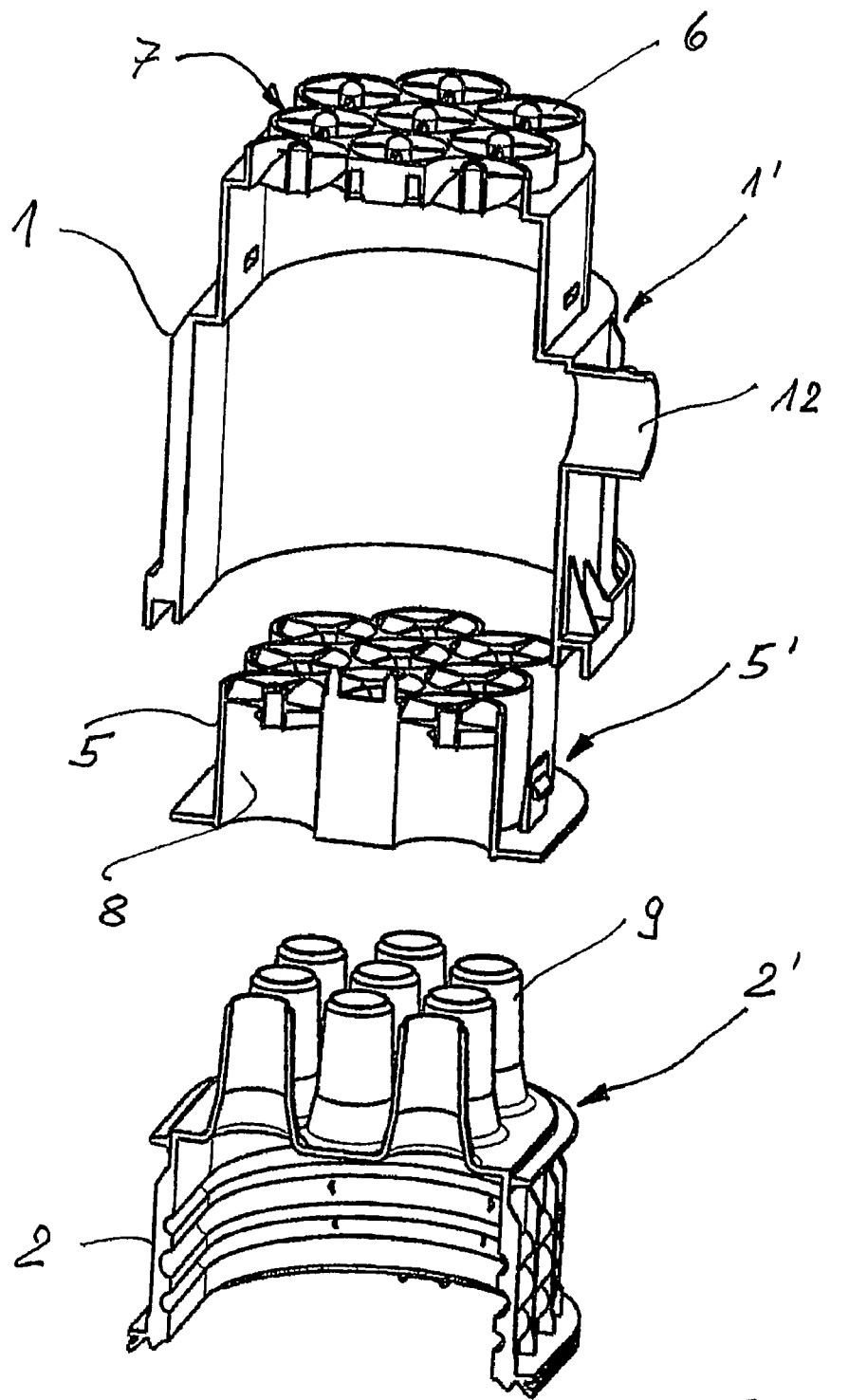

| | | |
|---|---|---|
| 4,289,611 A | 9/1981 | Brockmann |
| 4,537,608 A | 8/1985 | Koslow |
| 4,746,340 A | 5/1988 | Durre et al. |
| 6,884,273 B2 | 4/2005 | Kopec et al. |
| 6,932,849 B2 * | 8/2005 | Sheidler et al. ............... 55/347 |
| 6,991,664 B2 | 1/2006 | Riehmann et al. |

* cited by examiner

GAS INTAKE ZONE OF A GAS FILTER HOUSING, USED AS A PREFILTER

CROSS REFERENCE TO RELATED APPLICATIONS

Applicants claim priority under 35 U.S.C. §119 of German Application No. 10 2005 031 059.1 filed Jul. 2, 2005. Applicants also claim priority under 35 U.S.C. §365 of PCT/DE2006/001068 filed Jun. 23, 2006. The international application under PCT article 21(2) was not published in English.

The present invention relates to a gas intake zone of a gas filter housing that can be divided by a filter element and accommodates a filter element replaceably, said gas intake zone being used as a prefilter and/or preseparator, in particular in an intake filter in a commercial vehicle according to the preamble of Patent Claim 1.

Known filters of this type, when they are made of plastic, consist of a base body and spin-generating elements inserted therein into the intake zones of the individual cyclones. With such preseparators, a plurality of cyclone collectors is provided in each base body, so a corresponding plurality of spin-generating elements is to be used individually. In addition, with such known preseparators, separated dirt particles can be removed from the preseparator only by suction because the dirt particle collecting space always remains in the interior of a closed preseparator housing in the case of a housing that is open for the purpose of replacement of the filter element. The dirt-collecting space can thus be emptied only through a closable cleaning port.

DE 29 18 765 A1 describes a centrifugal dust separator system having several stages for air intake machines, where the individual stages are designed for filtering out dust particles of different sizes.

The present invention relates to the problem of designing a generic preseparator to be economically manufacturable, especially if it is to be made of plastic. In addition, such a preseparator should be easy to clean.

This complex of problems is already solved primarily by the embodiment of a generic preseparator according to the characterizing feature of Patent Claim 1.

Advantageous and expedient embodiments are the subject of the subclaims.

The present invention is based on the general idea of dividing the preseparator into three separate zones that can be made of plastic and are easily assembled to form a preseparator unit that is ready to use. In doing so, the spin-generating elements are divided into two zones that are to be joined together, namely a first zone and a second zone, to facilitate their manufacture by a plastic injection molding process. The first and second zones are each formed by a one-piece component. Spin-generating elements assembled in this way from two component elements can be produced by injection molding, although they could not have otherwise been manufactured in one piece because of their complex shape involving undercutting.

Hollow cylindrical cyclone sections are also shaped in the second zone containing partial elements of the spin-generating elements, where particles of dirt can collect as deposits on the wall from the spiral flow of a filter medium due to the centrifugal force within these sections.

The third one-piece zone of which the preseparator is assembled according to the present invention has a bottom with immersion tubes that are open continuously and protrude out of the bottom on the oncoming flow side, said bottom being positionable downstream from the second zone and arranged at the gas intake zone of the filter housing. These immersion tubes engage in the hollow cylindrical cyclone sections when the third zone is inserted into the gas intake zone of the filter housing, where together with these sections they form annular channels for removing the particles of dirt that settle out into a dirt particle space. This dirt particle space is bordered by the foot areas of the immersion tubes, the bottom of the third zone and an area of the outside wall of the gas intake zone of the filter housing.

By means of a detachable connection of the third zone with respect to the gas intake zone of the filter housing, by removing the third zone from the filter housing, it is easy to clean the dirt particle space, which is then open, through a detachable connection of the third zone with respect to the gas intake zone of the filter housing.

The insertion of a number of spin-generating elements corresponding to the cyclone collectors contained in the preseparator, which has been customary in the past, is eliminated by dividing the spin-generating elements into partial zones, which are in turn an integral one-piece component of the preseparator housing, and those which are in the second zone as an additional one-piece insertion part that is inserted into the preseparator.

The accessory part forming the second zone for the spin-generating element in the preseparator may be connected to the preseparator housing by catch means. The same thing is also true of the connection between the second and third zones.

Figure 2:
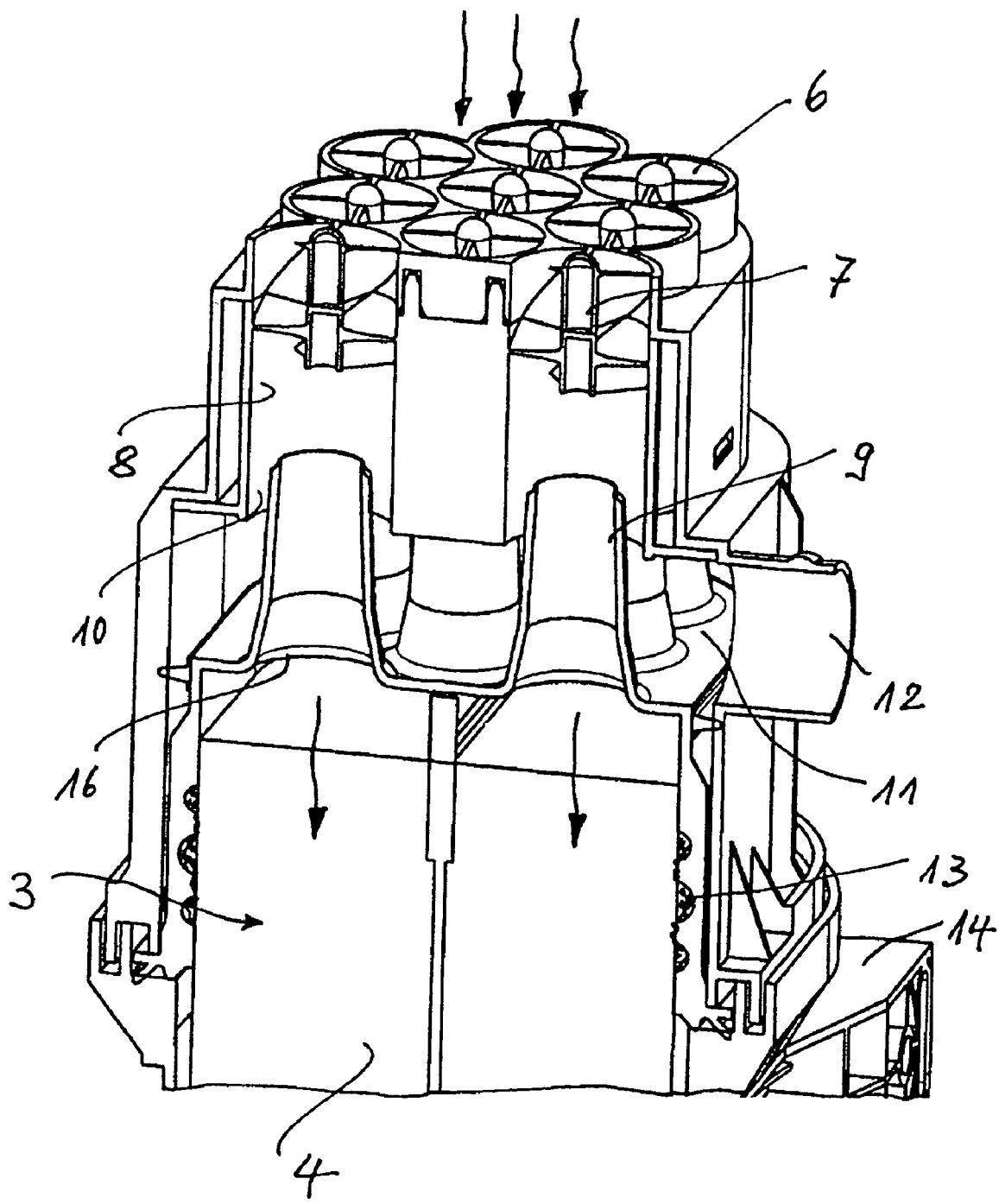

An advantageous exemplary embodiment which is described in greater detail below is illustrated in the drawings, in which FIG. 1 shows an exploded diagram of a filter housing zone which serves as the preseparator, FIG. 2 shows a section through a preseparator according to FIG. 1 in the installed state including a replaceably inserted filter element.

A gas intake zone of a gas filter housing which functions as a preseparator is composed of a filter housing cover 1 as a first zone 1', a connecting element 2 of a filter element 3 as a third zone 2' through which flow can pass axially, with a filter core 4 of coiled filter material and an insert part 5 as a second zone 5'. The components 1, 2 and 5 are made of plastic by the injection molding method and form the first, second and third zones 1', 5', 2' in the sense of the embodiments of the preceding introduction to the description and the wording of the patent claims. With regard to the secondary of 5', which in the exemplary embodiment shown here is a complete connecting element 2 of a replaceable filter element 3, it should be pointed out that this need not be specifically in the form of such a connecting element 2. Instead, an embodiment which does not constitute an element fixedly connected to the filter element 3 is also possible. In such a case, the third zone 2' comprises only a bottom with immersion tubes 9 molded into it. The bottom may then be detachably connected as such to the filter housing cover 1. For example, catch closure means may serve as the connecting elements.

In the assembled state of the prefilter according to the diagram in FIG. 2, the medium to be filtered, e.g., the intake air for a commercial vehicle engine, enters the preseparator through a plurality of intake openings 6 in the filter housing cover 1 according to the flow arrows shown in FIG. 2.

Within the intake openings 6, there are spin-generating elements 7 which are composed of first elements molded in one piece in the first zone 1' of the filter housing cover 1 and second elements situated downstream, which are part of the insertion part 5 as the second zone 5'. The two elements of the spin-generating elements 7 together form a spin-generating element 7 which could not be manufactured in this form in a one-piece injection molded part. The connection of the insert part 5 to the filter housing cover 1 is accomplished via catch closure means.

Downstream from the spin-generating elements 7 formed by component elements of the first and second zones 1', 5", hollow cylindrical flow channels 8 are connected thereto in the insert part 5; in the installed state of the preseparator, immersion tubes 9 of the connecting element 2 of the filter element 3 engage in these flow channels. With the preseparator installed, an annular channel 10 is formed between the immersion tubes 9 and the outside walls of the hollow cylindrical flow channels 8, opening into a dirt particle collecting space 11 situated downstream. The bordering walls of a joint dirt particle collecting space 11 are formed by the connecting element 2 and by the filter housing cover 1. The division between these components, namely the second and third zones, is provided so that the dirt particle collecting space 11 necessarily opens over a large area in separation of the filter element 3 from the filter housing cover 1—such as that which occurs when replacing the filter element. The dirt particle collecting space 11 is opened over a large area in the case of the filter element 3, which is separated from the filter housing cover 1, so that dirt particles present in the collecting space 11 can be shaken off easily.

The individual flow channels 8 are each functionally individual cyclone dirt collectors together with the respective spin-generating elements 7 and the immersion tubes 10 plus the joint dirt particle collecting space 11.

To be able to clean a dirt particle collecting space 11 even when the filter housing is closed, i.e., when the preseparator is closed, a closable cleaning connection 12 is provided through which dirt particles can be removed with suction in the manner customary in the past.

The filter core 4 of the filter element 3 is mounted in the connecting element 2 in such a way that there is an oncoming flow space 16 which is otherwise closed between the oncoming flow surface of the filter core 4 on the face end and the immersion tubes 9. Filter medium entering this oncoming flow space 16 through the immersion tubes 9 may in this way flow through the filter core 4, which is made of coil filter material, for example, in the longitudinal direction according to the flow arrows shown in FIG. 2. To seal the aforementioned flow space, ring gaskets 13 are provided between the filter core 4 and a ring wall of the connecting element 2 surrounding the filter core 4.

The filter housing cover 1 is tightly connectable to the filter housing base body 14 by means of known quick closure means.

The connection between the insert part 5 as the second zone 5' and the filter housing cover 1 as the first zone 1' can be established easily by means of catch closure means 15.

All the features described in the description and in the following claims may be essential to the invention either individually or in any combination with one another.

The invention claimed is:

1. A gas intake zone (1) of a divisible gas filter housing which supports a replaceable filter element (3) and serves as a prefilter having a plurality of cyclone collectors arranged side-by-side, each receiving oncoming flow axially and each having spin-generating elements (7) in their intake zones and axially immersed gas outlet immersion tubes (9) on the outlet end in their respective interior within annular channels (10) provided between these immersion tubes (9) and the respective cyclone outside walls for preseparation of dirt particles separated radially outward due to centrifugal forces in the individual cyclones, wherein the totality of the cyclones comprises a unit made up of three zones (1', 5', 2'), namely a first zone (1') which is molded in one piece with the filter housing and has first spin-generating partial elements, a second zone (5') designed as an insert part (5) with a second spin-generating component element adjacent to the first spin-generating component elements, which together with the first spin-generating component elements form the spin-generating element (7) and hollow cylindrical flow channels (8) situated downstream from the spin-generating element (7), a third zone (2') which is likewise designed as a part to be inserted and contains the immersion tubes (9) with a bottom surrounding the immersion tubes (9) to form a dirt particle collecting space (11) connected to the annular channels (10) of the cyclones within the filter housing (1); and the zones (1', 2', 5') are each formed by a one-piece-component and produced by a plastic injection moulding process.

2. The prefilter according to claim 1, wherein the third zone (2') is fixedly connected to the replaceable filter element (3).

3. The filter element for a prefilter according to claim 2, wherein the filter element (3) has a closed oncoming flow space through which flow can pass exclusively via the immersion tubes (9) of the third zone (2').

4. The prefilter according to claim 1, wherein in the case of a filter element (3) detached from the filter housing (1), the dirt particle collecting space (11) jointly surrounding the immersion tubes (9) is opened necessarily over a wide area as a result of the division of its bordering walls on the filter element end and/or the filter housing end.

5. The prefilter according to claim 1, wherein the insert part (5) which forms the second zone (5') and is detachable from the filter housing (1) can be connected to the filter housing (1) via complementary catch closure means provided on these two components.

\* \* \* \* \*